Aug. 15, 1961     D. L. SMEAL     2,996,197
IRRIGATION PIPE MOVING APPARATUS
Filed Dec. 30, 1957     4 Sheets-Sheet 1
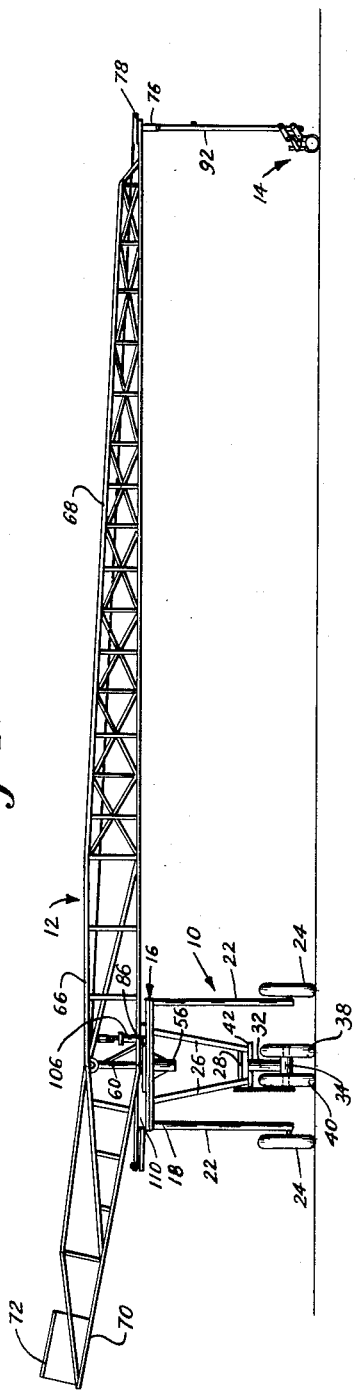
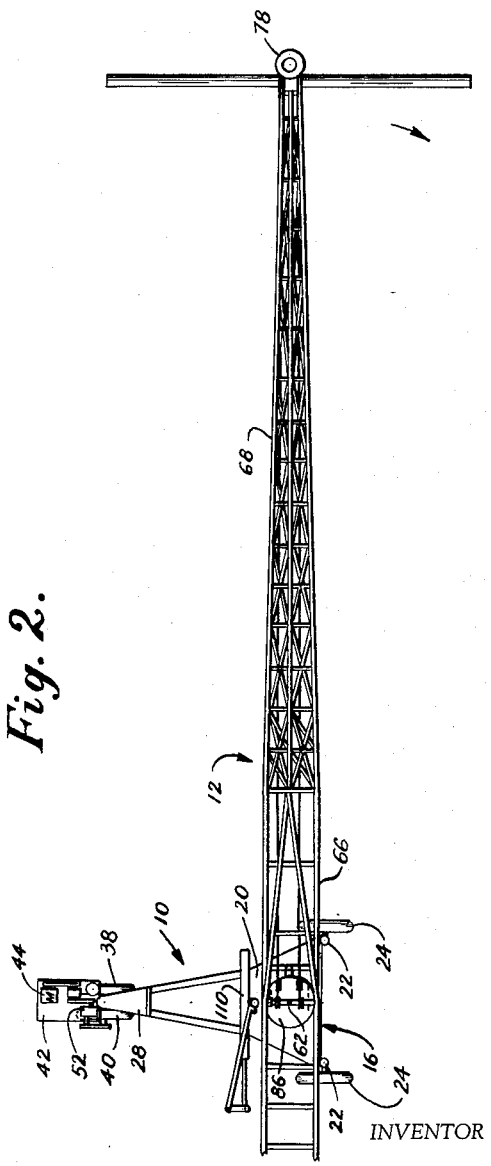
INVENTOR
DONALD L. SMEAL
BY Cushman, Darby & Cushman
ATTORNEYS

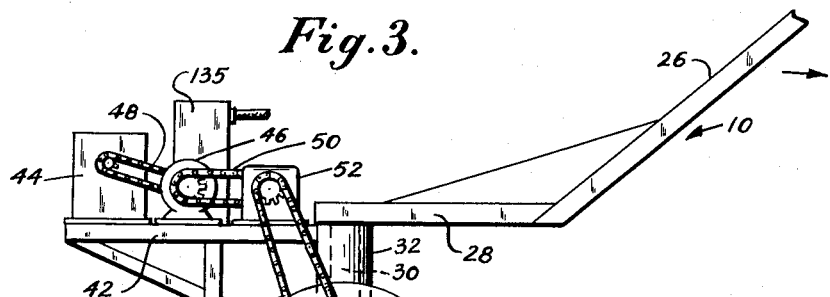
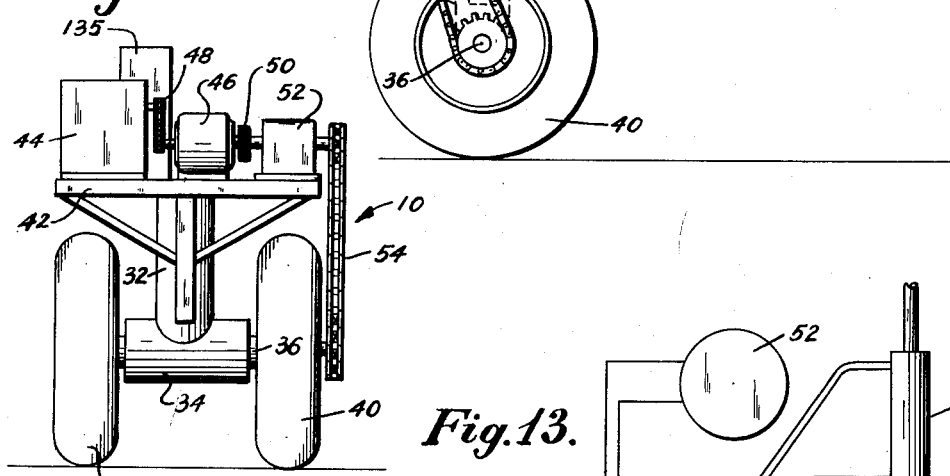
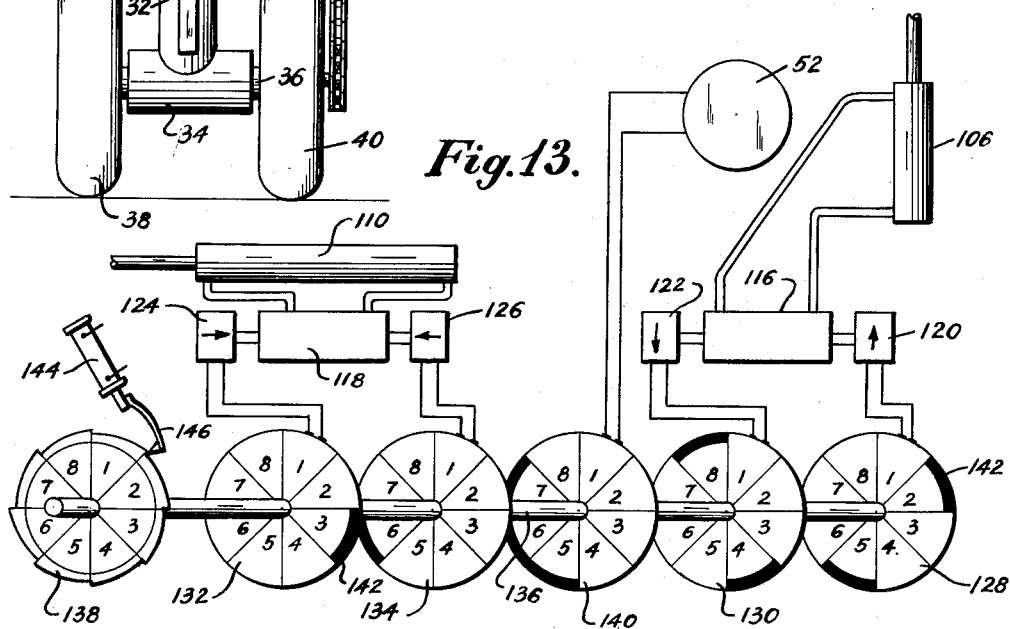

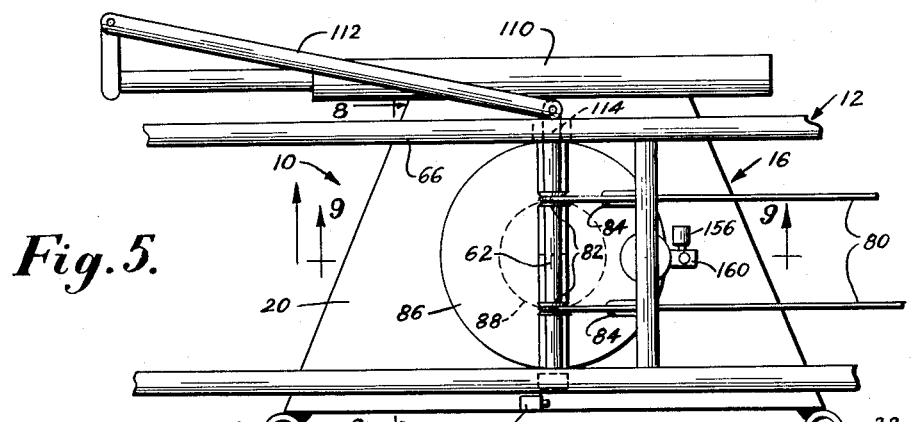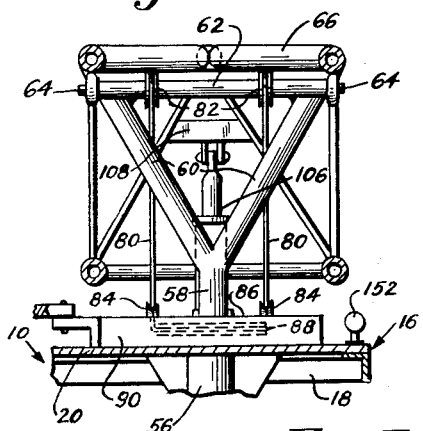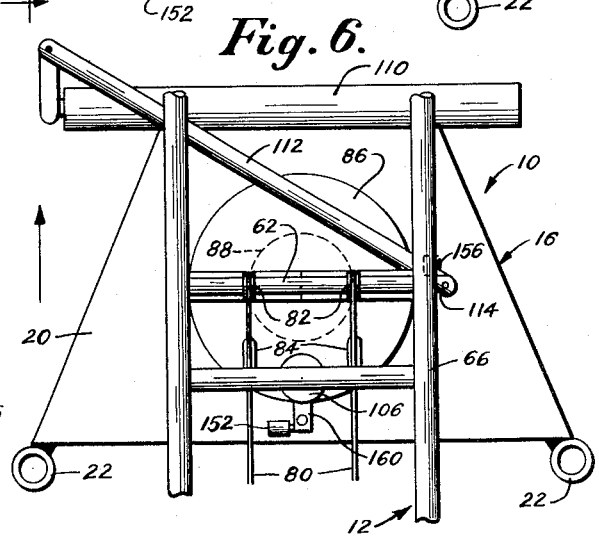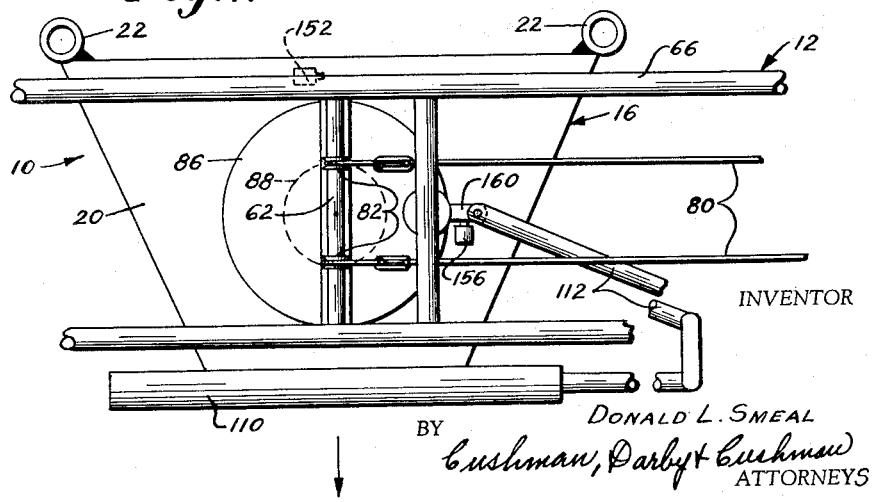

Aug. 15, 1961     D. L. SMEAL     2,996,197
IRRIGATION PIPE MOVING APPARATUS
Filed Dec. 30, 1957     4 Sheets-Sheet 4
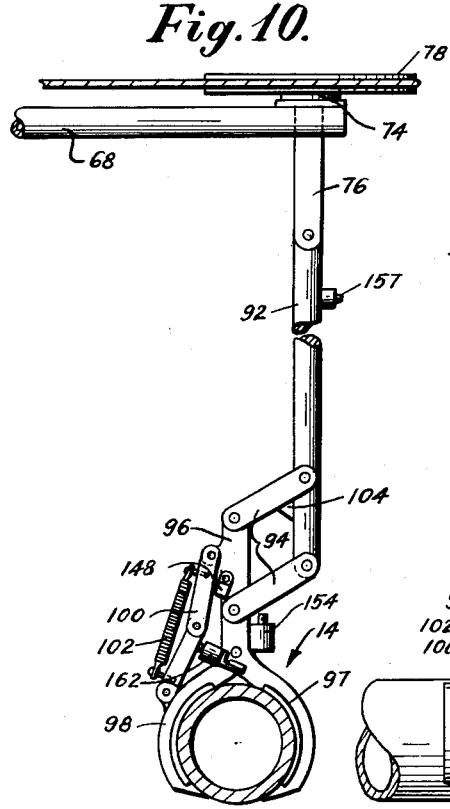
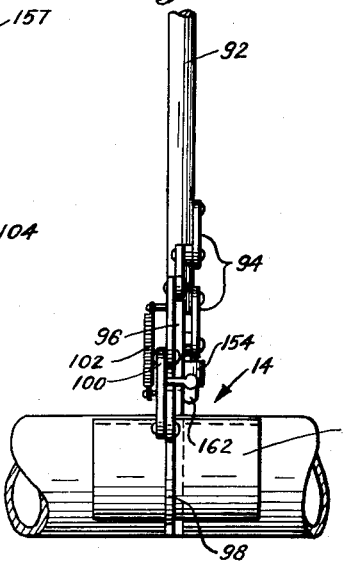
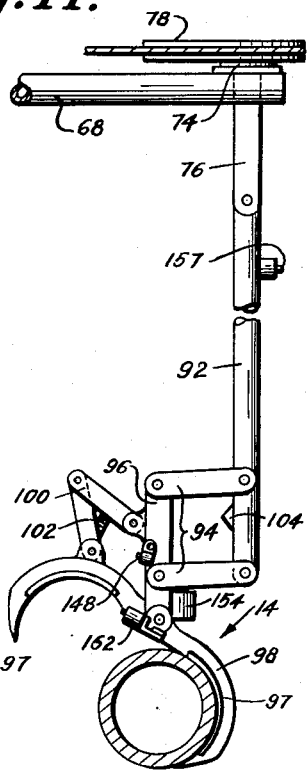
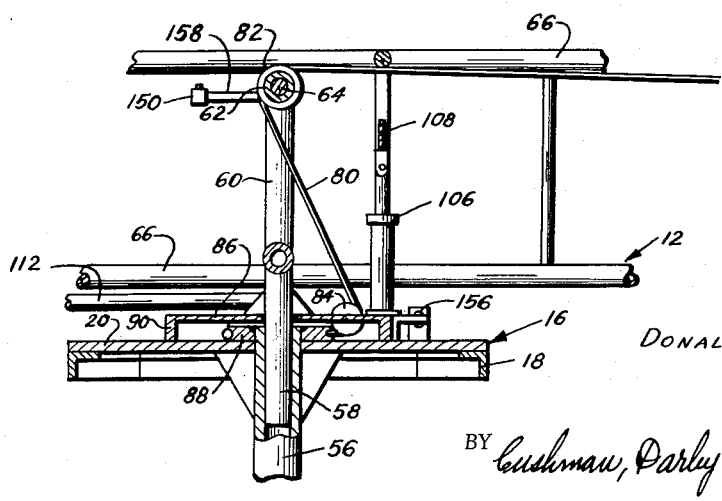
INVENTOR
DONALD L. SMEAL
BY Cushman, Darby & Cushman
ATTORNEYS

United States Patent Office 2,996,197
Patented Aug. 15, 1961

2,996,197
IRRIGATION PIPE MOVING APPARATUS
Donald L. Smeal, Snyder, Nebr., assignor, by mesne assignments, to L. R. Nelson Mfg. Co., Inc., Peoria, Ill., a corporation
Filed Dec. 30, 1957, Ser. No. 705,979
28 Claims. (Cl. 214—1)

This invention relates to article handling and more particularly to an apparatus for moving irrigation pipe or the like in a field from one position to a second position laterally remote therefrom.

In the conventional use of irrigation pipe in corn fields or the like, the source of water is connected to a conduit which extends through the field transverse to the rows of corn. Due to the capacity of the water source in most installations only one, two or possibly three lateral conduit assemblies disposed parallel with the rows are connected to the main conduit. In a usual installation, each lateral conduit assembly is made up of pipe sections 30 or 40 feet in length coupled together to a total length of approximately ¼ mile or more. The pipe sections are usually made of aluminum in 4″, 5″, 6″ or 8″ diameters and connected together by conventional coupling means. Riser pipes are secured to the coupling means at intervals of approximately 60 feet, each riser having a spray nozzle on its upper end. Ordinarily, a pipe with a riser attached will have a weight of around 35 pounds, depending on the size thereof, up to a maximum of approximately 50 pounds.

Water is pumped to the spray nozzles in the lateral conduit assembly and the spray from each nozzle extends in a radius of approximately 40 feet. In normal operation, spraying will be continued for a period of approximately 8 to 10 hours and then the pipe sections making up the lateral conduit assembly must be moved over a distance of approximately 60 feet, or approximately 18 rows of corn to spray the next section of the field.

Heretofore, manual labor has been employed to effect the movement of the pipe sections from the position in which they have been operating to the new position parallel thereto 60 feet away. Such labor is difficult to obtain, since, of necessity, the worker must be performing many of the operations required in an area of the field, which has been made muddy due to continuous sprinkling for a period of approximately eight to ten hours. The worker must go in the mud beside the lateral conduit assembly between the corn rows and disconnect the sections and then carry each one a distance of 60 feet or more to a position between rows and then assemble the same therein. The procedure is further made difficult due to the height of the corn, which may reach a distance of over eight feet, making it necessary for the worker to handle a 30 or 40-foot pipe section weighing up to 50 pounds without excessive damage to the crop.

It will be readily apparent that the cost of the labor in effecting the movement of the pipe sections from their previous position of operation to their new position of operation spaced some 18 rows away constitutes a considerable expense particularly since this expense is multiplied by the necessary procedure of moving the pipe approximately 8 to 10 times in a 20 acre field to accomplish sprinkling of the entire field and the further necessary procedure that the entire sprinkling operation is usually carried out 4 to 6 times a year. The total cost to the farmer for the entire year just for labor in effecting movement of the pipe is sufficiently great that even a relatively expensive apparatus capable of reducing this labor cost would pay for itself over a period of two to three years.

It is an object of the present invention to provide an apparatus for effecting the movement of pipe sections from a previous position of use to a new position of use spaced laterally therefrom which will reduce to a minimum the high labor costs previously required in such operation.

Still another object of the present invention is the provision of an apparatus of the type described which can be operated by a single attendant.

Still another object of the present invention is the provision of an apparatus of the type described having means for automatically effecting the movement of the pipe section from one position to the other.

Still another object of the present invention is the provision of an apparatus of the type described embodying a vehicle which is propelled along a field to be irrigated at a position remote from the position where the lateral conduit assembly has been operating so that the same will have traction on dry land, rather than on land which has been sprayed for a period of 8 to 10 hours, such vehicle further having means provided thereon for extending laterally to the pipe sections in their position of previous use and for effecting movement of the pipe sections therefrom to a new position of use laterally remote therefrom.

Still another object of the present invention is the provision of an apparatus of the type described including an elongated boom extending outwardly from a vehicle and means for controlling the operation of the vehicle and boom by a single attendant stationed at the outer end of the boom.

Still another object of the present invention is the provision of an apparatus of the type described including a self-propelled vehicle having means thereon for automatically steering the same along a predetermined path in a field, such as between rows of corn or the like.

Still another object of the present invention is the provision of an apparatus of the type described having improved means for gripping a pipe section and automatically releasing the same in response to a predetermined operation of the apparatus.

These and other objects of the present invention will become more apparent during the course of the following detailed description and appended claims.

The invention may best be understood with reference to the accompanying drawings, wherein an illustrative embodiment is shown.

In the drawings:

FIGURE 1 is a rear elevational view of an apparatus embodying the principles of the present invention;

FIGURE 2 is a top plan view of the apparatus;

FIGURE 3 is an enlarged fragmentary side elevational view of the steerable driving wheel assembly of the vehicle;

FIGURE 4 is a front elevational view of the wheel assembly;

FIGURE 5 is an enlarged fragmentary top plan of the connection between the vehicle and the elongated boom of the present invention, showing the boom in its pipe pick-up position;

FIGURE 6 is a view similar to FIGURE 5 showing the boom in its pipe lay-down position;

FIGURE 7 is a view similar to FIGURE 5 showing the boom in its pipe pick-up position when the vehicle is traveling in a direction opposite to that shown in FIGURE 5;

FIGURE 8 is a cross-sectional view taken along the line 8—8 of FIGURE 5;

FIGURE 9 is a cross-sectional view taken along the line 9—9 of FIGURE 5;

FIGURE 10 is an enlarged fragmentary rear elevational view of the connection of the boom to the pipe gripping means showing the latter in gripping engagement with a pipe section;

FIGURE 11 is a view similar to FIGURE 10 showing the pipe gripping means in its release position;

FIGURE 12 is a side elevational view of the structure shown in FIGURE 10; and

FIGURE 13 is a schematic view of control system of the apparatus.

Referring now more particularly to the drawings, there is shown in FIGURES 1 and 2 an apparatus embodying the principles of the present invention. In general, the apparatus includes a self-propelled steerable vehicle, generally indicated at 10, which is operable to move between rows of corn or the like along a predetermined path parallel thereto, an elongated boom assembly, generally indicated at 12, mounted on the vehicle for movement in a horizontal plane and in a vertical plane, and a pipe gripping means 14 on the outer end of the boom assembly 12 for engaging the pipe and carrying the same from a previous position of use to a new position of use laterally remote therefrom.

The vehicle 10 comprises an upper horizontal frame section 16, which is preferably constructed of suitable frame members 18 or the like rigidly secured together, as by welding or the like, into a trapezoidal configuration, and a plate 20 secured to the upper surfaces as by welding or the like. A pair of elongated vertical wheel supporting members 22 are rigidly secured at their upper ends, as by welding or the like, to opposite sides of the rear end of the horizontal frame section. At their lower ends, the members 22 have wheels 24 mounted thereon by any suitable means, the vertical extent of the members 22 being such as to dispose the frame section 16 above ground level a distance sufficient to substantially clear the tops of mature corn plants.

Extending downwardly from opposite sides of the forward end of the frame section 16 is a pair of forwardly converging frame members 26 having their forward ends rigidly interconnected with a horizontal plate 28 or the like. A vertical post 30 has its upper end secured, as by welding or the like, to the plate 28 and extends downwardly to seat within a vertical sleeve 32. Rigidly secured to the lower end of the sleeve 32, as by welding or the like, is a horizontal tubular member 34 having a rigid shaft 36 journalled therein. One end of the shaft extends outwardly from one end of the member 34 to fixedly receive a first wheel 38 and the opposite end thereof extends outwardly from the opposite end of the member 34 to fixedly receive a second wheel 40.

Rigidly secured to the vertical sleeve 32 and extending forwardly therefrom is a suitably braced platform 42 of any desired construction having mounted thereon an engine 44, such as a conventional internal combustion engine or the like. A hydraulic pump 46 is connected with the drive shaft of the engine by any suitable means, such as a sprocket wheel and chain assembly 48. Another sprocket wheel and chain assembly 50 or the like is connected between the pump 46 and the input shaft of an electromagnetic clutch 52 of conventional construction. The outlet shaft of the electromagnetic clutch 52 is connected with the shaft 36 on which the wheels are mounted to drive the same by still another sprocket wheel and chain assembly 54 or the like.

Mounted in the central portion of the horizontal section 16 of the vehicle is a vertical sleeve 56, having its upper end welded or otherwise rigidly secured to the undersurface of the plate 20 and its lower end suitably braced to the horizontal frame section. Journalled within the vertical sleeve and extending upwardly through the plate 20 is a shaft 58 having a pair of upwardly diverging arms 60 rigidly secured thereto at the lower ends thereof. The upper ends of the diverging arms 60 are rigidly interconnected by a tubular member 62 having a shaft 64 journalled therein, the outer ends of which are connected with the boom assembly 12.

The boom assembly 12 may be of any suitable construction and, as shown, includes a central section 66 of box-shaped configuration suitably formed of welded structural elements or the like. An elongated operative boom section 68 of triangular configuration suitably formed of welded structural elements or the like is rigidly secured to one end of the central section and extends outwardly therefrom. The opposite end of the central section has a counterbalancing section 70 of similar construction rigidly secured therewith. Weight means 72, preferably in the form of a drum for receiving sand or the like, is suitably mounted on the outer end of the counterbalancing section.

As best shown in FIGURES 10 and 11, the outer end of the boom section 68 has a vertical bearing 74, fixed thereto as by welding or the like, which receives a vertical shaft 76. A sheave 78 is fixedly secured to the upper end of the shaft and has an endless cable 80 trained thereabout which is also trained about a pair of upper transversely spaced sheaves 82, journalled on the tubular member 62 about the axis of the shaft 64 extending therethrough, a pair of lower transversely spaced sheaves 84 journalled in a bearing disk 86 rigidly secured to the shaft 58 above plate 20, and a horizontally disposed sheave 88 rigidly secured to the upper end of the sleeve 56 about the axis of the shaft 58. The bearing disk 86 has an annular flange 90 extending downwardly from the periphery thereof into engagement with the upper surface of the plate 20 to aid in supporting the boom assembly.

The shaft 76 extending downwardly from the sheave 78 on the outer end of the boom has its lower end pivotally connected about a transverse axis, as by a friction pivot or the like, to the upper end of an elongated member 92 which carries the gripping means 14. The gripping means 14 is mounted on the member 92 by a pair of parallel links 94 pivotally connected therewith and to a standard 96. Rigidly secured to the lower end of the standard 96 is a first transversely elongated pipe gripping jaw 97. A second pipe gripping jaw 98 of similar construction is pivoted at the lower end of the standard for movement toward and away from the first jaw so as to grip a pipe therebetween. In order to effect such movement of the pivoted jaw 98, a toggle linkage 100 is connected between the latter and the standard 96. The linkage 100 is of conventional construction and includes a spring 102 for moving the same over center to lock the jaw 98 in a pipe gripping position with respect to the first jaw in one direction and in the opposite direction to urge the pivoted jaw into a release position with respect to the first jaw. A stop 104 of suitable construction is rigidly secured to the member 92 in a position to engage the upper parallel link 94 to limit the downward movement of the gripping jaws with respect to the member 92.

In order to effect a movement of the boom assembly 12 in a vertical plane about the axis of the shaft 64, there is provided a double-acting hydraulic cylinder and piston unit 106 of conventional construction connected between the bearing disk 86 and a suitably braced transverse strut 108 rigidly secured to the central section 66 of the boom assembly. Horizontal movement of the boom assembly about the axis of shaft 58 is accomplished by a similar double-acting hydraulic cylinder and piston unit 110 rigidly secured to the horizontal frame section 16 as by welding the cylinder to the plate 20. A connecting rod 112 has one end thereof pivoted to the piston rod of the unit 110 and its opposite end pivoted to a lug 114 rigidly secured to the disk 86 and extending outwardly therefrom.

In accordance with the present invention, suitable means is provided for automatically effecting the movement of the gripping means 14 through a cycle of operation which includes a vertical translational movement from a first position where the pipe is initially gripped to a position elevated thereabove, a lateral movement during which the pipe is moved translationally in a horizontal plane arcuate about the axis of the vertical shaft 58 to a position elevated above the position where the pipe is to be moved, and, finally, a vertical translational movement from the last-mentioned elevated position into the position of new use. In addition to the above, suitable means are provided for returning the gripping means in order to pick up the next section of pipe and, preferably, during this movement, the forward wheels of the vehicle are driven to move the vehicle forward into a position adjacent the next pipe section to be moved.

Referring now to FIGURE 13, to this end the hydraulic units 106 and 110 are suitably connected with the pump 46 in series with reversing valves 116 and 118, respectively, of conventional construction of the type normally biased into a position to shut off the flow of fluid under pressure into or out of both ends of the associated cylinder and piston unit. A solenoid 120 of conventional construction is connected with one end of the valve 116, which, when actuated, serves to move the same into a position to admit fluid to one side of the cylinder and exhaust fluid from the other side to thereby raise the outer end of the boom section 68. A similar solenoid 122 is connected with the opposite end of the valve 116 which, when actuated, reverses the direction of flow to lower the outer end of the boom section 68. In a like manner, the valve 118 has connected therewith a solenoid 124 which, when actuated, serves to direct the flow of fluid through the valve to the hydraulic unit 110 to swing the outer end of the boom section 68 rearwardly and a solenoid 126 which ultimately effects forward swinging of the outer boom section when actuated.

In order to actuate the solenoids of each valve at the proper time during the cycle there is provided a conventional rotary switch including four control disks 128, 130, 132 and 134 connected in series with the solenoids 120, 122, 124 and 126, respectively, and a suitable source of electrical power such as a battery or generator (not shown). Preferably, the electrical control system is mounted in a suitable box 135 suitably carried on the vehicle as by the platform 42. The control disks are mounted on a common shaft 136 having a ratchet wheel 138 rigidly secured thereto. A fifth disk 140 is mounted on the shaft 136 and suitably connected in series with the source of electrical power and the electromagnetic clutch 52 to control the driving of the forward wheels 38 and 40. Each of the disks has conductor strips 142 mounted on the periphery thereof at circumferentially spaced positions thereon to complete the circuits to the associated electrical device controlled thereby as the ratchet wheel is moved. In order to move the ratchet wheel there is provided a solenoid 144, of conventional construction, having a spring-pressed dog 146 connected therewith which successively engages one of either teeth formed on the ratchet wheel to move the latter ⅛ of a turn for each actuation of the solenoid 144. The solenoid 144 is actuated by a plurality of switches 148, 150, 152, 154, 156 and 157, each suitably connected in series therewith and with the source of electrical power. Each switch is of conventional construction of the type adapted to send an electrical impulse to the solenoid when actuated.

The switch 148 is suitably connected with the gripping means 14 so as to be actuated in response to the movement of the pivoted jaw 98 into its pipe gripping position with respect to the jaw 97. As shown in FIGURES 10 and 11, the switch 148 is suitably mounted on the standard 96 in a position to be engaged by the toggle linkage 100 when the latter is moved into its overcenter relation locking the pivoted jaw into gripping engagement.

The switch 150 is arranged to be actuated in response to the movement of the outer end of the boom section 68 into a predetermined height with respect to the ground level. As shown in FIGURE 9, the switch 150 is mounted on a bracket 158 rigidly secured to the tubular member 62 and extending outwardly therefrom. The switch 150 is mounted on the outer end of the bracket 158 in a position to be engaged by a structural element of the center boom section 66 when the latter reaches a predetermined angular position with respect to the vehicle or tubular member 62.

The switch 152 is arranged to be actuated by movement of the outer end of the boom section 68 rearwardly by swinging movement about the shaft 58 into a position substantially parallel with the vehicle. As shown in FIGURES 5 and 6, the switch 152 is removably mounted on the upper surface of the plate 20 in a position to be engaged by an apertured lug 160 rigidly secured to the bearing disk 86 and extending radially outwardly therefrom.

The switch 154 is arranged to be actuated in response to the movement of the pipe carrying gripping means 14 into engagement with the ground. As shown in FIGURES 10 and 11, the switch 154 is secured to the standard 96 of the gripping means in a position to be engaged by the lower parallel link 94 when the standard has been moved upwardly with respect to the elongated member 92, as by engagement of the pipe carrying gripping means with the ground, to thereby effect pivoting of the parallel links.

In this regard, the present invention further contemplates the provision of suitable means for effecting a release of the pipe gripping means in response to the engagement of the same with the ground when the latter is carrying a pipe. To this end, there is provided a solenoid 162 which is suitably connected in series with the switch 154 to be actuated in response to the actuation of the latter. As shown in FIGURES 10 and 11, the solenoid 162 is mounted on the lower end of the standard 96 in a position to be engaged by the toggle linkage 100. It will be seen that when the solenoid 162 is actuated, the plunger thereof will move the toggle linkage from its locked overcenter position to its released overcenter position, the spring 102 serving to retain the same in its released position.

The switch 156 is similar to the switch 152 and is arranged to be actuated in response to the horizontal swinging movement of the outer end of the boom section 68 into its operative position disposed transversely of the vehicle. As shown in FIGURES 5 and 6, the switch 156 is removably mounted on the upper surface of the plate 20 in a position to be engaged by the lug 160.

The switch 157 is arranged to be manually actuated to stop the forward travel of the vehicle in a position to pick up the next pipe section. As shown in FIGURES 10 and 11, the switch 157 is suitably mounted on the elongated member 92 at a convenient height to be actuated by an operator.

*Operation*

In operation, it will be understood that the operator is stationed at a position between rows of corn adjacent the pipe sections which have been previously used and dismantled. The vehicle 10 is stationed approximately 18 rows from the pipe sections with the driving wheels 38 and 40 in a furrow between two rows of corn and the rear wheels 24 in the furrows on opposite sides of the first-mentioned furrow. It is contemplated that prior to operation, the longitudinal center of gravity of the pipe sections will have a suitable marking placed thereon so that the operator can readily determine the proper position at which the gripping jaws should be engaged on the pipe sections. When the jaws 97 and 98 are closed around a pipe section by the operator the switch 148 disposed on the standard 96 is actuated by the engagement of the toggle linkage 100 therewith. The solenoid 144 is energized by the actuation of the switch to move the disks ⅛ of a turn into a second position indicated at 2 on the disks. In the initial starting position indicated at 1 on the disks, it will be noted that all of the disks are in a position such that the circuits to the electromagnetic clutch and solenoids controlled thereby are interrupted. When the disks are moved by the actuation of the solenoid 144 into their second position, a contact strip 142 on the disk 128 serves to complete the circuit to the solenoid 120 which operates the valve 116 which in turn permits the unit 106 to be actuated to raise the boom and hence the pipe gripped by the gripping means on the outer end thereof.

When the boom reaches a predetermined position of vertical angularity with respect to the horizontal frame section of the vehicle, the switch 150 is actuated as shown in FIGURE 9. The solenoid 144 is actuated in response to the actuation of the switch 150 to turn the ratchet wheel ⅛ of a revolution and hence move the disks into a third position, indicated at 3 thereon. In this position, the circuit to the solenoid 120 is interrupted and a contact strip 142 on the disk 132 serves to complete the circuit to the solenoid 124 which actuates the valve 118 to permit fluid under pressure to be introduced to the unit 110 and hence move the boom about its vertical shaft 58 in a horizontal plane, thus carrying the pipe section gripped by the means 14 therewith.

It will be noted that the vertical member 92 which carries the gripping means 14 is connected to move with the sheave 78 on the outer end of the boom. The sheave 88 which is rigidly connected with the vehicle has a diameter equal to the sheave 78 and through the endless cable 80 trained about both of these sheaves, the horizontal angular movement of the boom with respect to the vehicle will effect a corresponding angular movement of the sheave on the outer end of the boom so that the pipe is at all times maintained in a position parallel with the rows during the horizontal swinging movement of the boom.

The switch 152 is mounted in a position to be engaged by the lug 160 when the boom has moved into a position approximately parallel with the row. Actuation of the switch 152 sends an impulse to the solenoid 144 which is actuated to turn the ratchet wheel ⅛ of a revolution and hence the disks are moved into a fourth position, indicated at 4 thereon. In the fourth position, the circuit to the solenoid 124 is interrupted and a strip 142 on the disk 130 moves into a position to complete a circuit to the solenoid 122 which in turn actuates the valve 116 to permit fluid under pressure to be introduced into unit 106 and hence lower the boom.

During the lowering movement of the boom, the pipe section and also the gripping means 14 carrying the same will engage the ground, causing an upwardly pivotal movement of the parallel links 94 until switch 154 is actuated. Actuation of the switch 154 serves to energize solenoid 162 which moves the toggle linkage 100 into its overcenter release position where it is maintained by the spring 102. The solenoid 144 is also actuated in response to the actuation of the switch 154 so as to move the ratchet wheel ⅛ of a turn and hence the disks connected therewith into a fifth position, as indicated at 5 thereon. In the fifth position, the circuit to the solenoid 122 is interrupted which causes the valve to move into its normal position preventing flow to or from the unit 106 and hence stop the downward vertical movement of the boom.

In the fifth position, a conductor strip 142 on the disk 128 serves to complete a circuit to the solenoid 120 which moves the valve 116 into a position to permit fluid under pressure to be introduced into the unit 106 to initiate upward vertical movement of the boom. Also in the fifth position, a conductor strip 142 on the disk 140 serves to complete a circuit to the electromagnetic clutch. Energization of the electromagnetic clutch drivingly connects the propelling wheels 38 and 40 of the vehicle with the engine 44 and the entire apparatus is moved parallel to the corn rows.

In this regard, it will be noted that the driving wheels 38 and 40 are mounted on the vehicle at the forward end thereof by rigidly connected horizontal and vertical tubular members 32 and 34 so that the remainder of the vehicle including the rear wheels 24 is pivoted with respect to the driving wheels in much the same way as a conventional trailer is pivoted to the driving tractor. It should also be noted that in operation in a corn field, a furrow is formed between each row of corn stalks and the spacing of the wheels 38 and 40 is such that they will normally ride on oppositely inclined portions of the furrow. Since the forward wheels are the traction wheels of the vehicle, they will tend to pull the entire vehicle forward as they are rotated by the engine. Assuming that the vehicle tends to move laterally in one direction, it will be seen that the wheel in this direction, as for example wheel 38, will be moving on an upwardly inclined part of the furrow, while the wheel 40 on the opposite side will be moving down an inclined portion of the furrow. Because of the spread of the rear wheels 24, the driving wheel 40 which tends to move down the furrow loses traction and may even move out of contact with the ground so that all of the traction for the vehicle is in the opposite wheel 38 which is tending to ride up the inclined portion of the furrow. Since both wheels 38 and 40 are pivoted about the vertical shaft 39 spaced equidistant between the two, the traction on the wheel 38 will cause a pivotal movement of both about the axis of the shaft 30 and, in this way, the rotation of the wheel 38 which is in engagement with the ground will tend to move the same toward the center of the furrow until equal traction of both wheels occur. In this way, the driving wheels of the present vehicle will maintain the same in a path which follows the furrow between the corn rows. Deviations from this path of travel are automatically compensated for by the action described above. The vehicle 10 is thus self-steering and will propel the entire apparatus parallel with the rows of corn upon actuation of the clutch 52.

It will be noted that the upward vertical movement of the boom by the unit 106 occurs simultaneously with the forward movement of the vehicle and, preferably, the return horizontal swinging movement will be completed before it is necessary to stop the vehicle to pick up the next pipe section. To this end, when the boom reaches the same predetermined position of vertical angularity with respect to the vehicle, the switch 150 will be actuated which sends an impulse to the solenoid 144 to turn the ratchet wheel ⅛ of a revolution and hence the disks connected therewith into a sixth position, indicated at 6 thereon. In the sixth position, the circuit to the solenoid 120 is interrupted, causing the vertical movement of the boom to cease and a conductor strip 142 on the disk 134 completes a circuit to the solenoid 126 which actuates the valve 118 into a position permitting fluid under pressure to enter the unit 110 and thus swing the boom in a horizontal plane about its vertical axis. Of course, since the forward travel of the vehicle must be continued, the circuit to the clutch 52 remains completed by a conductor strip 142 on the disk 140 in position 6.

When the boom reaches a predetermined horizontal angularity with respect to the vehicle transverse to the rows of corn, the switch 156 is actuated which, in turn actuates the solenoid 144 and hence move the ratchet wheel and the disks into a seventh position, as indicated at 7 thereon. In the seventh position, circuit to the solenoid 126 is interrupted to halt the horizontal swinging of the boom by the unit 110. Again, as in position 6, a conductor strip 142 on the disk 140 maintains the circuit to the electromagnetic clutch complete in position 7. With the disks in position 7, only the clutch 52 is actuated and hence the entire apparatus is being propelled by the vehicle longitudinally along the rows with the boom in a stationary raised position.

The operator stationed adjacent the pipe sections to be moved determines the position at which the gripping means must be stopped in order to engage the next pipe section and stops the travel of the vehicle by manually actuating the switch 157 on the vertical member 92. The solenoid 144 is actuated in response to the actuation of the switch 157 to move the ratchet wheel ⅛ of a turn and hence the disks connected therewith into an eighth position, indicated at 8 thereon. In the eighth position, the circuit to the electromagnetic clutch 52 is interrupted to thereby halt the forward movement of the vehicle. In addition, a conductor strip 142 on the disk 130 moves into a position to complete the circuit to the solenoid 122 which, in turn, actuates the valve 116 to cause fluid under pressure to enter the unit 106 and hence effect lowering of the outer end of the boom.

When the gripping means 14 on the lower end of the member 92 engages the ground, the parallel links 94 will be pivoted with respect to the vertical member to engage the switch 154 which, in turn, actuates the solenoid 144 to turn the ratchet wheel ⅛ of a revolution and hence the disks connected therewith into its initial position wherein all of the circuits to the solenoids and electromagnetic clutches are interrupted.

It will be understood that the operator continues to actuate the apparatus through the above-described cycle until all of the pipe sections which have previously made up the lateral conduit assembly are moved to the new position of use. In this regard, it will be noted that because the boom swings arcuately about the vehicle, the last two or three pipe sections which make up the assembly must be separately handled. The apparatus is such that when it is again desired to move the lateral conduit assembly after it has been used to a new position of use, the boom assembly 12 can be moved about the vertical shaft 58 so that the gripping means 14 extends from the opposite side of the vehicle. To accomplish this movement, the connecting rod 112 between the hydraulic piston and cylinder unit 110 and the bearing disk lug 114 is removed together with the switches 152 and 156. The boom is then moved in a horizontal plane to an oppositely disposed position and the connecting rod 112 is connected to the lug 160 on the bearing disk 86. The switches 152 and 156 are then mounted on the plate 20 in proper positions to be engaged thereby. The lug 160 is disposed at a vertical level below the vertical level of the lug 114 so that the latter does not engage the switch 152. It will be noted that with the boom assembly 12 in this position, as shown in FIGURE 7, the operator can actuate the apparatus so that it will go through the same cycle as indicated above.

It can thus be seen that there has been provided an apparatus for moving pipe sections from a previous position of use to a new position of use laterally remote therefrom. The apparatus is such that a single attendant stationed in the furrow adjacent the previous position of use can operate the apparatus by himself. The operation is substantially automatic and the only manual manipulation that is necessary is the actuation of the switch 157 to stop the apparatus at the desired location to pick up the next pipe section and the manual actuation of the gripping means into engagement with the pipe section. Of particular significance is the fact that the vehicle is at all times riding on land which is remote from the area where the irrigation has taken place. In this way, adequate traction is provided and the problems attendant to the operation of a vehicle in mud are eliminated. While the attendant is stationed in a muddy area, there is no manual manipulation necessary which requires strenuous effort. Moreover, the attendant is not constantly walking into and out of a muddy area, as is the case when pipe sections are moved by manual labor.

It will thus be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. Apparatus for transferring irrigation pipe sections or the like from a first position to a second position laterally remote from said first position comprising a wheeled vehicle, means for gripping a pipe section, and means movably carried by said vehicle including an elongated boom extending outwardly from said vehicle for stably supporting said gripping means and hence a pipe section gripped thereby through a cycle of movement between a first position laterally remote from said vehicle and a second position laterally remote from said first position disposed adjacent a vertical longitudinal plane passing through said vehicle, which cycle includes substantially vertical translational movement from said first position to a position elevated thereabove, lateral movement from said elevated position to a position elevated above said second position and substantially vertical translational movement from said elevated position above said second position to said second position, said boom extending outwardly from said vehicle in one direction a distance at least as great as the distance of lateral movement of said gripping means during said cycle.

2. Apparatus as defined in claim 1 wherein said vehicle includes means for propelling the same.

3. Apparatus as defined in claim 2 wherein said vehicle includes means for automatically steering the same to maintain the vehicle on a predetermined path of travel.

4. Apparatus as defined in claim 3 including means for actuating said propelling means in response to the movement of said gripping means into a predetermined position in said cycle of movement.

5. Apparatus as defined in claim 4 including means operable from a position adjacent the outer end of said boom for rendering said propelling means inoperable.

6. Apparatus as defined in claim 1 including means for releasing said gripping means, and means operable in response to the movement of said gripping means into said second position for actuating said releasing means.

7. Apparatus as defined in claim 6 wherein said cycle of movement further includes a return movement from said second position to said first position, and means operable in response to the release of said gripping means by said releasing means for initiating said return movement.

8. Apparatus as defined in claim 1 including means operable in response to the movement of said gripping means into the elevated position above said first position for effecting said lateral movement thereof.

9. Apparatus as defined in claim 1 including means operable in response to the movement of said gripping means into the elevated position above said second position for effecting the substantially vertical translational movement of said gripping means into said second position.

10. Apparatus of the type described comprising a vehicle frame constructed and arranged to move along a field of mature corn stalks, wheel means supporting said frame for movement along a predetermined path in the field, means supported by said wheel means for driving said wheel means to propel said frame, said wheel means including means for automatically maintaining the same on said predetermined path during the driving thereof, a counterbalanced boom carried by said vehicle frame for movement about a vertical axis and a horizontal axis transverse to said boom, article engaging means carried by said boom movable about the horizontal axis to a height above the mature corn stalks, the counterbalanced end of said boom being above the corn stalks during said latter movement, and means carried by said boom adjacent said article engaging means for controlling the operation of said driving means whereby a single attendant stationed remote from said vehicle frame adjacent the outer end of the boom can control the movement of said vehicle along said path, and an article carried by said article engaging means is thereby movable about said horizontal and vertical axes.

11. Apparatus as defined in claim 10 including means operable under the control of the single attendant for effecting movement of said article engaging means from a position disposed adjacent the position of the attendant to a second position laterally remote therefrom.

12. Apparatus as defined in claim 11 wherein said article engaging means includes means for releasing the same, and wherein means is provided for actuating said releasing means in response to the movement of said article engaging means into said second position.

13. Apparatus as defined in claim 10 wherein said vehicle frame includes a horizontal frame section, rear wheel carrying means extending downwardly from opposite sides of said horizontal frame section for maintaining the same in an elevated position sufficient to clear the rows of mature corn stalks in a field on opposite sides of a central furrow, a central frame section extending forwardly from said horizontal frame section, said wheel means includes a pair of rear wheels carried by said rear wheel carrying means in positions to ride in the furrows on opposite sides of the central furrow, and said automobile path maintaining means includes forward driven wheel means disposed to ride within the central furrow and connected with said central frame section for pivotal movement about a vertical axis.

14. Apparatus as defined in claim 13 wherein said forward driven wheel means comprises a pair of forward wheels spaced transversely apart sufficient to normally engage and ride on oppositely inclined surfaces forming the central furrow.

15. A vehicle for operation in a mature corn field comprising a horizontally disposed frame section, a pair of rear wheels spaced transversely apart a distance sufficient to ride in the furrows on opposite sides of a central furrow, rear wheel carrying means extending downwardly from opposite sides of said horizontal frame section for maintaining the same in an elevated position sufficient to clear the corn stalks of the rows between the central furrow and the furrows on opposite sides thereof, a central frame section extending forwardly from said horizontal frame section, forward wheel means disposed to ride within the central furrow, means mounting said forward wheel means on the forward portion of said central frame section for pivotal movement about a vertical axis, and means for driving said forward wheel means, the arrangement being such that the forward wheel means is self-guiding in the central furrow and the central frame section and horizontal frame section carried by the rear wheels track the same through pivotal movement about said vertical axis.

16. A vehicle as defined in claim 15 wherein said forward wheel means comprises a pair of forward wheels spaced transversely apart sufficient to normally engage and ride on oppositely inclined surfaces forming the central furrow.

17. A vehicle as defined in claim 16 wherein said forward wheels are rigidly mounted on a common horizontal shaft, and wherein said mounting means comprises a vertical shaft rigidly secured to said central frame section in depending relation thereon and having its axis coincident with said vertical axis, a sleeve journalled on said vertical shaft, and means on the lower end of said sleeve receiving said horizontal shaft.

18. Apparatus of the type described comprising: a wheeled vehicle; a boom having a central portion mounted on said vehicle for movement about a vertical axis and a horizontal axis transverse to said boom, an elongated operative portion extending outwardly from one end of said central portion, and a shorter counterbalancing portion extending from the opposite end of said central portion; a vertical member mounted on the outer end of said operative boom portion for pivotal movement about an upright axis; article-engaging means carried by the lower end of said vertical member; and means for effecting a pivotal movement of said member about said upright axis in response to the pivotal movement of said boom about its vertical axis.

19. Apparatus as defined in claim 18 wherein said article-engaging means comprises a pair of pipe gripping jaws movable relatively apart and together and a spring-pressed toggle linkage movable over center in one direction to lock said jaws together and in the opposite direction to maintain them apart.

20. Apparatus as defined in claim 19 wherein said article-engaging means is mounted on the lower end of said vertical member by means permitting limited vertical movement between said member and said article-engaging means, and wherein means is provided for effecting movement of said toggle linkage from its over center position locking the jaws together to its over center position maintaining the jaws apart in response to an upward movement of said article-engaging means relative to said vertical member.

21. In an apparatus of the type described, the combination comprising a boom, a pair of pipe gripping jaws movable relatively apart and together, a spring-pressed toggle linkage operatively connected with at least one of said jaws movable over center in one direction to lock said jaws together and in the opposite direction to maintain them apart, means permitting limited relative vertical movement between said jaws and said boom for mounting the jaws and associated toggle linkage on said boom, and means for effecting movement of said toggle linkage from its over center position locking the jaws together into its over center position maintaining the jaws apart in response to an upward movement of the jaws relative to said boom.

22. The combination as defined in claim 21 wherein said jaw mounting means comprising a rigid vertical member extending downwardly from the outer end of the boom and a pair of parallel links pivotally connected between said vertical member and one of said jaws.

23. Apparatus of the type described comprising: a wheeled vehicle, a generally horizontally extending boom pivotally mounted on said vehicle for movement in a generally horizontal plane about a vertical axis and in a generally vertical plane about a horizontal transverse axis, power means for effecting a pivotal movement of said boom about said horizontal axis in either direction and about said vertical axis in either direction, pipe gripping means movable between pipe gripping and pipe releasing positions mounted on the outer end of said boom for limited vertical movement with respect thereto, means operable in response to the movement of said pipe gripping means into said pipe gripping position for actuating said power means to move said gripping means from the position of engagement with a pipe to a second position laterally remote therefrom by upward and downward movement of the outer end of the boom and swinging movement thereof about the vertical pivotal axis of the boom.

24. Apparatus as defined in claim 23 including means for moving said gripping means from its pipe gripping position to its pipe releasing position and means operable in response to a vertical movement of said gripping means relative to said boom for actuating said gripping means and moving means.

25. Apparatus as defined in claim 23 including additional means operable in response to the vertical movement of said gripping means relative to said boom for actuating said power means to effect a return movement of said gripping means.

26. Apparatus as defined in claim 23 wherein said vehicle includes driving means and wherein still further means is provided which is operable in response to the vertical movement of said gripping means relative to said boom for actuating said vehicle driving means.

27. Apparatus as defined in claim 26 including means for automatically steering said vehicle along a predetermined path.

28. Apparatus as defined in claim 27 including means on the outer end of said boom for rendering said driving means inoperable.

References Cited in the file of this patent

UNITED STATES PATENTS

| | | |
|---|---|---|
| 1,023,507 | Davison | Apr. 16, 1912 |
| 1,106,094 | Harbinger | Aug. 4, 1914 |
| 1,326,732 | Holme | Dec. 30, 1919 |
| 1,423,854 | Howard | July 25, 1922 |
| 1,906,362 | Brown | May 2, 1933 |
| 2,486,479 | Kennedy | Nov. 1, 1949 |
| 2,574,634 | Frampton | Nov. 13, 1951 |
| 2,641,149 | Peterson | June 9, 1953 |
| 2,807,373 | Couser | Sept. 24, 1957 |
| 2,818,182 | Goesch | Dec. 31, 1957 |
| 2,846,081 | Moore | Aug. 5, 1958 |